United States Patent
Suzuki et al.

[15] 3,656,887
[45] Apr. 18, 1972

[54] METHOD OF REMOVING HYDROGEN SULFIDE FROM GASEOUS MIXTURES

[72] Inventors: Shigeto Suzuki, San Francisco; Giok H. Tjoa, Placentia; Karl H. Kilgren, La Habra, all of Calif.

[73] Assignee: Chevron Research Company, San Francisco, Calif.

[22] Filed: Aug. 21, 1969

[21] Appl. No.: 851,871

[52] U.S. Cl. ..................23/2 R, 23/181, 260/294.8 E
[51] Int. Cl. ........................B01d 53/16, B01d 53/34
[58] Field of Search ..................23/2, 2.3, 3, 3.3, 4, 181; 55/73; 260/551.5, 294.8 E

[56] References Cited

UNITED STATES PATENTS

| | | |
|---|---|---|
| 1,580,451 | 4/1926 | Sperr, Jr. ..................23/181 |
| 3,120,993 | 2/1964 | Thormann et al. ..................23/2 |
| 3,242,646 | 3/1966 | Miller et al. ..................55/73 X |

*Primary Examiner*—Earl C. Thomas
*Attorney*—A. L. Snow, F. E. Johnston, C. J. Tonkin and G. F. Magdeburger

[57] ABSTRACT

The process for selectively removing $H_2S$ and like sulfides from fluids containing them by contact with a cyanopyridine (e.g., a mixture of ortho and meta cyanopyridines) and an alkali hydrosulfide, preferably in a substantially hydroxyl-free solvent such as N-methyl pyrrolidone. Preferably, in the process an admixture of $H_2S$ and $CO_2$ in natural gas is contacted with the cyanopyridine containing contacting solution to react the $H_2S$ with said cyanopyridine, the $CO_2$ and/or like hydrocarbons are rejected from the contacting solution by mild heating and/or pressure reduction and thereafter $H_2S$ is regenerated by heating the remaining solution.

8 Claims, 1 Drawing Figure

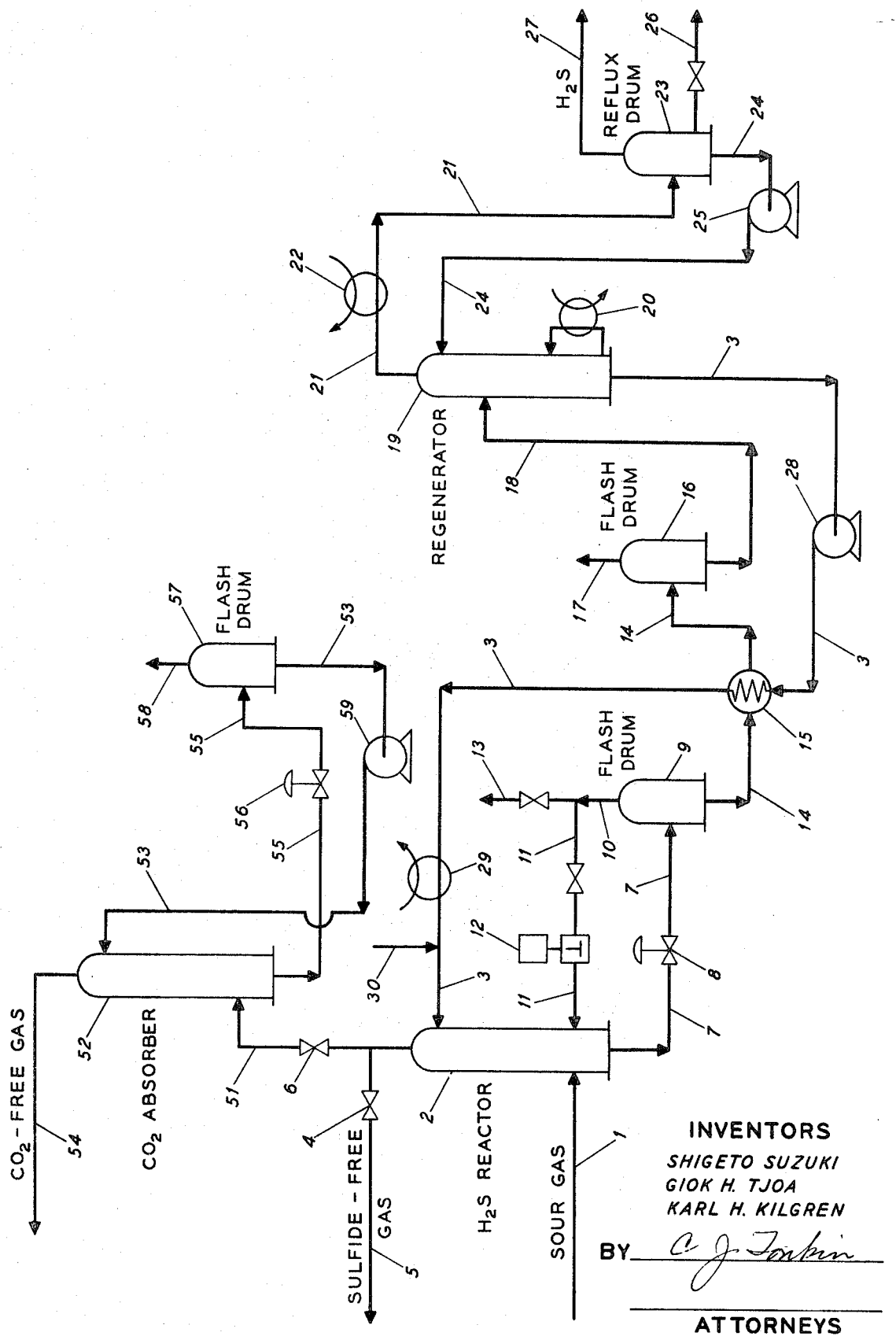

METHOD OF REMOVING HYDROGEN SULFIDE FROM GASEOUS MIXTURES

BACKGROUND OF THE INVENTION

This invention relates to the selective removal of sulfides such as hydrogen sulfide from fluids by contacting such fluids with cyanopyridine and hydrosulfide in an anhydrous solvent. The invention has particular application to the selective removal of hydrogen sulfide from admixtures of normally gaseous hydrocarbons, carbon dioxide and hydrogen sulfide.

Natural gas often contains appreciable amounts of $H_2S$ along with $CO_2$ and normally gaseous hydrocarbons and it is desirable to remove $H_2S$ from natural gas and similar fluids. Also, it is important to remove sulfides such as mercaptan, as well as hydrogen sulfide, to produce fluid effluents of low residual sulfur content. In many instances, $H_2S$ must be removed in order to meet pipeline specifications (for example, to a maximum of 0.25 grains of $H_2S$ per 100 SCF of gas), but the simultaneous removal of $CO_2$ is often unnecessary or undesirable.

While a multiplicity of known processes is available for the removal of acidic constituents from gas streams, all can be classified under one or a combination of four major groupings as follows: (1) processes involving an acid-base neutralization wherein the gaseous acidic component is converted to a salt (i.e., neutralization process); (2) processes involving physical solution wherein the gaseous acidic component is dissolved in a liquid solvent in accordance with the principle of Henry's law and no chemical reaction takes place (i.e., physical solution process); (3) processes involving physical permeation and adsorption of the gaseous acidic component within the pores of a suitable, solid absorbent material (i.e., adsorption process); and, (4) processes involving an oxidation reaction wherein $H_2S$ and certain sulfides are oxidized to elemental sulfur or a higher state of oxidation while $CO_2$ being in its highest state of oxidation is nonreactive (i.e., oxidation process). Each of the foregoing groups of processes has characteristic properties which may be used to delineate or predict the advantages and disadvantages of any individual process included within the classification.

Thus, the neutralization processes are essentially nonselective for $H_2S$ or $CO_2$, since both components are acidic and readily neutralized by a chemical base. The alkanolamine process, which is the most commonly employed regenerative neutralization process, utilizes water for a solvent and operates at acid gas loadings less than stoichiometrically attainable to reduce corrosion of processing equipment. Further, the chemical reaction constant for alkanolamines and $H_2S$ is such that in most instances it is economically impractical to produce a treated gas which meets pipeline specifications regarding $H_2S$ at pressures significantly less than 100 psi because of the increased reagent circulation and regeneration requirement.

Physical solution processes may show some selectivity for $H_2S$ relative to $CO_2$, but the relative preference for $H_2S$ is generally limited to severalfold rather than one or more orders of magnitude. Furthermore, the actual amount of $CO_2$ removed from the treated gas stream can be substantially larger than the quantity of $H_2S$ removed, depending on the initial concentrations of each component in the original gas stream. In general, it is economically impractical to produce a treated gas which meets pipeline $H_2S$ specifications with a physical solution process because of the high degree of solvent regeneration and high rate of solvent circulation required. Finally, $CO_2$ and hydrocarbon components dissolved in the solvent solution cannot be rejected by flashing the rich solvent to a lower pressure or heating the rich solvent to a higher temperature, because substantial quantities of $H_2S$ would be liberated concurrently in accordance with established equilibrium distribution ratios.

Physical permeation/adsorption processes are quite similar to physical solution processes with respect to the selective removal of $H_2S$ from a gas stream containing both $H_2S$ and $CO_2$. The difference in size of an $H_2S$ molecule (3.1 A.) and a $CO_2$ molecule (3.8 A.) when compared to the variation in pore sizes of treated synthetic zeolites or molecular sieves is insufficient to ensure more than a modest increase in the ratio of $H_2S$ to $CO_2$ removed. Similarly, the actual quantity of $CO_2$ co-adsorbed can be substantially large, depending on its initial concentration in the gas stream, thereby reducing the capacity of the molecular sieve for $H_2S$. Furthermore, permeation/adsorption processes must be operated in a batchwise manner which is undesirable from the standpoint of equipment duplication and recycle or disposal of the sour regeneration gas stream. Finally, this method of processing is capacity-limited and generally restricted to either low $H_2S$ concentrations, or small sour gas volumes because of physical limitations on vessel diameters and investment costs for equipment.

Oxidation processes are truly selective or specific for removing $H_2S$ and certain alkyl sulfides from admixtures of $CO_2$ and natural gas. Gaseous $H_2S$ is generally converted to elemental sulfur by any of a variety of oxidizing agents suspended on a solid support or dissolved in a suitable solvent. The iron-sponge or dry-box process, which is the most commonly used solid support process today, is a batchwise process and subject to very similar equipment duplication and capacity limitations cited for the physical permeation/adsorption process. In addition, sulfur is generally not recovered in this process but is thrown away with the spent bed material which must be replaced periodically at substantial inconvenience to replenish the active oxidant. Liquid phase oxidation processes operate in a continuous manner and sulfur is generally recovered as a salable product. However, these processes in general are plagued with plugging problems in flow lines and elements, since sulfur is precipitated as a solid in the liquid phase. Additional techniques and equipment such as flotation chambers and filters which are not commonly used or understood by the natural gas industry are also required. Finally, some processes (Giammarco-Vetrocoke, Thylox) employ highly toxic oxidizing agents (arsenic oxides and thioarsenates) potentially detrimental to the safety of operating personnel and public at large.

SUMMARY OF THE INVENTION

In accordance with the present invention, a process has now been found that will selectively, or specifically remove $H_2S$ and other sulfides from $H_2S$-$CO_2$-natural gas mixtures, wherein the foregoing cited problems are either eliminated or substantially reduced. The present invention is directed to a process for removing sulfides from fluids by contacting such fluids with a cyanopyridine and an alkali hydrosulfide, or compounds capable of producing alkali hydrosulfide, preferably in a substantially hydroxyl-free solvent. After the foregoing contacting step, the $CO_2$ which may be absorbed is preferably rejected or desorbed by flashing the sour solution at a lower pressure and/or higher temperature.

By means of the process of the present invention the $H_2S$ and other sulfides are reacted with the contacting solution, thereby producing a fluid effluent of substantially reduced sulfide content. A major advantage of the present process is that no matter what the initial concentration of $H_2S$ is, the process can remove essentially all the $H_2S$ present, i.e., down to the last traces of $H_2S$. Thus, pipeline specification gas (less than 0.25 grain $H_2S$/100 SCF of gas) or essentially completely $H_2S$-free gas (i.e., less than 0.01 grain $H_2S$/100 SCF of gas) can be produced by the present process.

Additional advantages of the process are that it can be conducted at relatively low pressures such as atmospheric pressure or even subatmospheric pressure, and the contacting can be carried out at relatively high temperatures. Also, the nonaqueous contacting solutions are relatively noncorrosive. The enriched contacting solution is readily regenerated by heating with or without the aid of an inert stripping gas.

It is believed that the process involves the reaction of the sulfides with the cyanopyridine to form thioamide in the case of $H_2S$ removal or thioamide derivatives in the case of removal of mercaptans. This differs from absorption of $H_2S$ in benzonitrile or in N-methyl 2-pyrrolidone (U.S. Pat. No. 3,120,993). $H_2S$ absorbed in the foregoing components is released at least in part upon pressure reduction and/or mild heating, whereas $H_2S$ when reacted within stoichiometric limits with the cyanopyridine in the liquid contacting solution of the present invention is not evolved upon pressure reduction or mild heating, i.e., below the point of decomposition of the reaction product of the cyano-pyridine and the sulfide (e.g., below 250° F. when using a mixture of ortho and meta cyanopyridine in a solvent of N-methyl 2-pyrrolidone). In accordance with the present invention, the contacting solution can remove sulfides more completely than the so called physical absorbents or solvents which are limited by an equilibrium between the partial pressure of the sulfide in the gas phase and its concentration in the liquid phase as described by Henry's law. When the cyanopyridine $H_2S$ ratio is greater than stoichiometric, essentially all the $CO_2$ and hydrocarbons can be flashed off (by pressure reduction and/or mild heating) without release of any appreciable amount of $H_2S$.

The cyano-pyridines employed in the contacting solution of the present process have a relatively high chemical reactivity toward $H_2S$ and similar organic sulfides. The cyanopyridines can have ring substituents such as additional cyano substituents. Other suitable substituents include electron-attracting substituents such as COOH, Cl, Br, I, F, and the like. Hence, suitable cyanopyridines include para-cyanopyridine, ortho-cyanopyridine, meta cyanopyridine, 2-chloro, 3-cyanopyridine, 3-bromo, 4-cyanopyridine, 2,6-dicyanopyridine, and 5-methyl, 3-cyanopyridine. Derivatives of the cyanoyridines can be employed provided that the additional groups such as methyl ring substituents do not interfere (e.g., by steric hindrance) with the desired reaction. The dicyanopyridines other than vicinal dicyano pyridine (e.g., 2,3 or 3,4-dicyanopyridines) are preferred for their regenerability. Ortho cyanopyridine is preferred and a mixture of ortho and meta cyanopyridine is especially preferred in view of its high reactivity, high capacity, regenerability of its reaction products, solubility and thermal stability.

Sufficient cyanopyridine is brought into contact with the sulfide-containing feed to react with at least an appreciable proportion of the sulfides present. In continuous contacting systems, the feed rate, the contact time, the rate of circulation of contacting solution and the concentration of cyanopyridine in the contacting solution all bear on the ratio of cyanopyridine to sulfide. Ideally for complete sulfide reaction, a stoichiometric ratio of cyanopyridine to $H_2S$ (or equivalent S compound to be reacted) would be used, but practically a slight excess is normally used. The stoichiometric ratio is defined as one gram equivalent of the cyanopyridine on a cyano group basis for each gram equivalent of sulfide to be reacted. While it is usually preferable to exceed the stoichiometric ratio of cyano groups to sulfide, sometimes it may be economical, particularly with high $H_2S$ partial pressures (due to high total pressure or high $H_2S$ content), to use a lower ratio, whereby part of the sulfide loading capacity of the contacting solution will depend upon the solvent selected. In general, the concentration of cyanopyridine in the contacting solution may vary from 0.1 weight percent up to the solubility limit, preferably in the higher ranges for maximum sulfide loading of the contacting solution.

The alkali hydrosulfide used in the contacting solution is believed to act as a catalyst for the reaction of the sulfides with the cyanopyridine to form the thioamides or derivatives thereof. The alkali hydrosulfide salts such as potassium hydrosulfide, sodium hydrosulfide, lithium hydrosulfide, ammonium hydrosulfide and dimethyl ammonium bisulfide and the like are suitable. Of the several hydrosulfides, potassium bisulfide is especially preferred because of its high catalytic activity and in addition its ease of preparation and thermal stability. Instead of the alkali hydrosulfide itself, compounds which are capable of forming alkali hydrosulfides in the contacting solution under the reaction conditions may also be used; for example, sodium sulfide and potassium hydroxide both convert to hydrosulfides in the contacting solution in the presence of $H_2S$ and hence these compounds may be used instead of the alkali hydrosulfides per se. The amount of alkali hydrosulfide present in the contacting solution preferably should be maintained at a ratio to the amount of nitrile present of 0.01 to 0.5 gram mol of hydrosulfide per gram equivalent of cyanopyridine. Generally the upper limit on the amount of alkali hydrosulfide is determined by solubility in the contacting solution.

Although the cyanopyridines which are liquid at operating conditions can be used with little or no solvent, it is generally preferred to use a solvent in order to keep the ingredients and reaction products dissolved in the contacting liquid. Such solvent should be an hydroxyl-free liquid since it has been found that the presence of hydroxyl groups interferes with the process; it is believed that hydroxylated solvents such as glycols react with the alkali hydrosulfide during the regeneration of the contacting solution. In other words, the solvent should be inert during the contacting and the regeneration to the reaction products as well as the selected nitrile and alkali hydrosulfide. The solvent should be able to hold in solution the selected cyanopyridine and hydrosulfides as well as the reaction products of the feed with the contacting solution. Also, the solvent should be thermally stable at the conditions of use.

In order to increase the reaction of the sulfides with the reagents in the contacting solution, it is preferred that the solvent have the property of readily absorbing or rapidly dissolving the $H_2S$ or other sulfides to be removed from the feed. To minimize losses throughout the processing cycle, it is preferred that the solvent have a relatively low volatility. Suitable solvents include pyrrolidones such as 2-pyrrolidone (m.p.=70°F.), N-methyl 2-pyrrolidone (m.p.=12° F.), piperidones, cyclotetramethylene sulfones such as sulfolane and dimethyl sulfonlane, lower alkylene carbonates such as propylene carbonate, benzonitrile, dialkyl ethers of polyethylene glycol such as 1,2-bis [2 methoxyethoxyl] ethane (triglyme) or bis [2-(2-methoxyethoxy) ethyl] ether (tetraglyme), and mixtures thereof. Solvents having high solvent power or good affinity for $H_2S$ are generally preferred. Of these, N-methyl 2-pyrrolidone is especially preferred because of its affinity for $H_2S$, low crystallization point, low vapor pressure and dissolving power for the reagent and reaction product.

As indicated above, the process is especially applicable to the preferential removal of $H_2S$ from admixtures of light hydrocarbons such as $C_1$-$C_5$ hydrocarbons, carbon dioxide and $H_2S$. A special feature of the present invention is the substantial removal of $H_2S$ from such gaseous admixtures so that, for example, natural gas (predominantly methane) containing relatively small amounts of H per 100 SCF) can be efficiently treated to produce a pipeline specification gas of below 0.25 grain of $H_2S$ per 100 SCF even when the sour natural gas stream is at atmospheric of subatmospheric pressure. (1 grain $H_2S$ per 100 SCF is equivalent of 15.9 ppm by volume and 22.88 mg/m³).

While the process has special application to treating gases having the foregoing dilute $H_2S$ content, the process can be applied advantageously to the selective removal of $H_2S$ and like sulfides from fluids having higher concentrations of these undesirable sulfides. In addition to natural gas, other suitable feed streams include industrial gas streams (such as obtained in oil refinery operations) as well as flue gases, fuel gases and hydrogen gas streams contaminated with sulfides. The present process can also be used to remove $H_2S$ from synthesis gas (i.e., mixture of $H_2S$ with $H_2$, CO, and $CO_2$), produced by partial oxidation of sulfur-containing hydrocarbonaceous materials. A particular application is for the selective removal of $H_2S$ from Claus furnace tail gases, where the Claus furnace is run under conditions to leave some unconverted $H_2S$ in the tail gas.

The process can be advantageously used to remove hydrogen sulfide and hydrocarbon derivatives thereof such as mercaptans. Normally these derivatives will be lower molecular weight alkyl mercaptans and the feeds to the process including the contaminating sulfides preferably have boiling ranges similar to natural gas, i.e., are gaseous at standard conditions.

In most instances, it is desirable to have the feed substantially dry; however, the process can be applied satisfactorily to moist gases. Usually, it is preferable to dehydrate the feed and most desirably with a dehydrating agent that does not carry over into the sulfide removal system or that, if so carried over, does not adversely affect the contacting solution in the sulfide removal system. A particularly advantageous arrangement is to use the pyrrolidones as the solvent in the contacting solution of the sulfide removal system and to use the same pyrrolidone in a pretreatment stage of contacting to dehydrate the feed gas. If there is any carryover of pyrrolidone from the dehydrating pretreatment, the pyrroline does not adversely affect the sulfide removing solution and can be easily recovered. N-methyl 2-pyrrolidone has been found to be an excellent dehydrating liquid.

The process of this invention can be carried out using contacting procedures conventional in absorption methods wherein the sulfide-containing feed is contacted with the contacting solution either batchwise or countercurrently or concurrently. While batchwise contacting can be used, it is preferred to contact the sulfide containing feed in a countercurrent absorption tower with the contacting solution in a continuous flow method. Suitable bubble cap or perforated trays, or packing such as raschig rings or berl saddles, or other means of ensuring adequate and efficient contacting can be provided. Carbon dioxide and light hydrocarbons which become absorbed in the solvent of the contacting solution are preferably first rejected in one or more stages of flashing accomplished by reducing the pressure on the solution. A substantial portion of the aromatic and heavier hydrocarbons absorbed by the solvent may be rejected by simultaneously or subsequently increasing the temperature of the contacting solution to a value not exceeding the decomposition temperature of the reaction products and venting the resulting vapors. Thereafter, the spent contacting solution is preferably regenerated by additional heating to raise the temperature of the solution above the decomposition temperature of the reaction products, thereby dissociating the reaction products and effectively separating the sulfides from the liquid phase contacting solution.

In some instances, such as when processing gases of relatively low $H_2S$ concentrations (e.g., one-half mole percent $H_2S$ or less), it may be preferable to partially regenerate the spent contacting solution by a simple heat and flash cycle, thus increasing the required circulation rate of the contacting solution and thereby improving the stability of the contacting column operation. In most instances, and particularly when processing gases containing relatively high concentrations of $H_2S$ (e.g., 1 mole percent $H_2S$ or higher), it is preferable to use a conventional reboiled stripping column for regenerating the spent contacting solution, thereby obtaining more complete regeneration and increased thermal efficiency in the processing cycle. In other instances, and particularly when the contacting solution contains a solvent which degrades appreciably at its normal boiling point, the spent contacting solution may be regenerated by heating together with an insert gas such as nitrogen, methane, and the like. Where the enriched contacting solution is not adversely affected, air can be a preferred inert gas and stripping agent. Also, contacting solutions which contain solvents that degrade appreciably at their normal boiling point may be regenerated by introducing a thermally stable liquid of increased volatility, e.g., benzonitrile, xylene, paraffinic hydrocarbons, and the like, into the reboiler zone and recovering the more volatile solvent in an overhead condenser for recirculation back to the reboiler zone. Regeneration time (i.e., residence time of the enriched contacting solution) depends inter alia upon the method of contacting, rate of stripping gas, if any, temperature, pressure, the nature and composition of the solution, and the amount of reaction products.

The contacting step of the process is generally carried out at temperatures above that sufficient to maintain solubility of the several components of the contacting solution as well as the reaction products. The maximum temperature in the contacting zone should be that which is below the temperature at which the desired reaction of the sulfides with the nitrile is reversed. Usually the temperature will be in the range from about $-5°$ F. to no more than 250°, depending upon the composition of the selected contacting solution. The pressures in the contacting step will be those which are practical such as from subatmospheric to 2,000 psig. Desirably the feed and contacting solution are brought together in continuous operations and at conditions which depend upon the sulfide content of the feed, the desired purity of product and the nature of the contacting solution.

After the desired rejection of dissolved $CO_2$ and hydrocarbons, such as by flashing at reduced pressure, the contacting solution is regenerated. The regeneration is carried out at higher temperatures than those used in the contacting step for the same contacting solution. Generally the temperature of regeneration will be the minimum required to obtain dissociation of the sulfide from the contacting solution within a reasonable period of time and the pressure may be from subatmospheric to superatmospheric. Usually the regeneration pressure is below 100 psig, and preferably in the range of 0 to 20 psig. When the $H_2S$ or equivalent sulfide goes to a Claus furnace, the regeneration is usually carried out at about 20 psig. The maximum temperature for regeneration is limited to prevent excessive loss or degradation of the components of the contacting solution. In most instances the regeneration temperature will be above 200°F. For example, at atmospheric pressure, the regeneration temperature can be in the range of 200° to 400° F., depending upon the stability of the ingredients of the contacting solution.

As indicated above, $H_2S$ released in the regeneration of the contacting solution can be introduced into a Claus plant for conversion to sulfur, and this combination of steps is particularly desirable. Also, the $H_2S$ can be treated in accordance with the process of Keller U.S. Pat. No. 3,401,101 or can be converted to sodium sulfide by contacting with an aqueous caustic solution.

Further, the contacting solution can be purified by intermittently or continuously withdrawing a portion of the solution and separately treating it to remove impurities. Alternately the solvent can be reclaimed and the solution reconstituted. For example, the cyanopyridines may be recovered by distillation.

Since the present invention involves a selective reaction of $H_2S$ and like sulfides with the cyanopyridine, the process can be used to remove all or any portion of the sulfide content of the feed. Thus, the process applies to removal of $H_2S$ in any concentration from $H_2S$-containing gases and is particularly applicable to purification of gases having low partial pressures of $H_2S$ such as below 0.1 psi of $H_2S$. Thus the process can remove sufficient $H_2S$, i.e., so the gas meets pipeline specification (0.25 grains $H_2S$/100 SCF of gas) or can remove all the $H_2S$. Although the process can be used to remove effectively $H_2S$ from gases containing little or no other acidic components, the process is especially effective in selectively removing $H_2S$ from gases containing appreciable amounts of $CO_2$.

DESCRIPTION OF THE DRAWING

The invention will be more fully understood by reference to the FIGURE and the following description which illustrate a preferred process flow of the present invention: a feed gaseous mixture such as sour natural gas containing $H_2S$ and $CO_2$ is fed through line 1 into the bottom portion of contactor 2. Contacting solution such as N-methyl-2-pyrrolidone containing 78.46 wt. percent of mixed ortho and meta cyanopyridine and 0.92 wt. percent of potassium hydrosulfide, is introduced into the upper portion of contactor 2 through line 3. Contactor 2 can be any suitable contacting column containing appropriate packing or trays to assure intimate countercurrent contact of the rising gaseous feed with the downwardly flowing contacting solution. Contactor 2 is maintained under such conditions of temperature and relative flow rates so that $H_2S$ is selectively reacted with substituted aromatic cyanopyridine within the stoichiometric limit, $CO_2$ being absorbed by the solvent to the extent determined by the conditions and amounts present.

Gas of substantially reduced $H_2S$ content is removed from the contactor and sent to the sales gas pipeline as purified gas via line 5 through valve 4, valve 6 being in a closed position.

The sulfide-enriched contacting solution is withdrawn from contactor 2 through line 7. If the withdrawn solution contains substantial amounts of dissolved $CO_2$ and/or hydrocarbons, as may occur at the higher contacting pressures, the solution can be passed through an expansion valve 8 to flash zone 9 for controlled pressure reduction to vaporize such dissolved $CO_2$ and/or hydrocarbons which are removed overhead via line 10, either for recycle to contactor 2 through line 11 and compressor 12, or other disposal via line 13.

The liquid withdrawn via line 14 from flash zone 9 (or, in the event the flash zone is omitted, the sulfide-enriched solution withdrawn from contactor 2) is passed through heat exchanger 15 into a second flash zone 16 where additional hydrocarbons and residual $CO_2$ can be removed via line 17 for suitable disposal. The liquid withdrawn via line 18 is passed to an intermediate point in a conventional stripping column 19 which is equipped with a reboiler 20 and which is operated under conditions to substantially regenerate the contacting solution. The $H_2S$-rich gas stream is removed overhead by means of line 21, passed through condenser 22 where vaporized solvent and hydrocarbons are condensed, then routed to reflux drum 23. The liquid phase is continuously removed from drum 23 by means of line 24 and returned via pump 25 to the top of column 19 to serve as reflux. Hydrocarbons which are not miscible with the condensed solvent can be withdrawn either continuously or intermittently via line 26 for suitable disposal. Concentrated $H_2S$ is removed from drum 23 via overhead line 27 for appropriate disposal such as to a Claus furnace or acid plant. The regenerated contacting solution is withdrawn from the bottom of column 19 through line 3 and returned via pump 28 to column 2, passing in turn through heat exchanger 15 and cooler 29 which reduce the temperature of the solution to the desired contacting temperature. Make-up solution may be added via line 30.

When it is desired to reduce the $CO_2$ content of the sulfide-free gas stream 5 below that obtainable with the stoichiometric circulation rate of contacting solution before mentioned (e.g., particularly when the $CO_2$ content and pressure of sour feed gas stream 1 are high), the sulfide-free gas is preferably passed to a second contactor 52 via valve 6 and line 51, valve 4 being closed. To avoid contamination of solvents, and to assist in the possible recovery of solvent from the gas stream leaving the first contactor, it is most desirable to employ the same liquid for a solvent in the contacting solution used in column 2 as is used for the absorbent in column 52. A suitable liquid for such purpose is, for example, N-methyl-2-pyrrolidone. In the second contactor 52, sufficient solvent is circulated to absorb the additional amount of $CO_2$ necessary to reduce the $CO_2$ content of the $H_2S$-free gas leaving contactor 52 via line 54 to the desired value. The solvent containing $CO_2$ withdrawn from contactor 52 is passed via line 55 through pressure reducer 56 to flash drum 57 (or other suitable solvent-$CO_2$ separator) and $CO_2$ is withdrawn for disposal through line 58. Regenerated solvent is recycled by means of line 53 and pump 59 back to the top of contactor 52.

When the $H_2S$ content and pressure of sour feed stream are low (e.g., less than 0.5 mol percent $H_2S$ and 100 psi), regeneration of the contacting solution may be accomplished preferably by a simple heat and flash cycle. In such cycle, all or a portion of the sulfide-rich contacting solution from the bottom of contactor is flashed to essentially atmospheric pressure through heat exchange to a heater wherein the temperature of the solution is raised to a value above that at which the reaction product decomposes, thence into an appropriate flash drum where $H_2S$ is removed via an overhead stream for suitable disposal and the partially regenerated contacting solution is removed via a bottom stream and pumped back to the top of contactor through suitable heat exchange and cooling. The circulation rate of contacting solution through the regeneration cycle depends inter alia upon the regeneration temperature and residence time as well as the pressure and $H_2S$ content of the sour feed stream. That portion of the sulfide-rich contacting solution which is not subjected to regeneration is recycled back to the top of the contactor where it is mixed with the partially regenerated solution prior to entering the column.

In the foregoing description in reference to the figure, various auxiliary equipment and processing alternatives have been eliminated for the sake of simplicity. For example, in place of expansion valves 8 and 56 turbo expanders can be used with the power offtakes arranged to drive solution pumps 28 and 59, to recompress flash gas streams 13 and 58, or like means of expansion energy recovery. Also, the sulfide-rich and $CO_2$-rich contacting solution pressures may be reduced in two or more stages, thereby enhancing power recovery or optimizing heat exchange. Further, appropriate heat exchange may be desirable at each expansion stage to avoid low solution temperatures resulting from isenthalpic or isentropic expansion. Also, regeneration of the sulfide-rich contacting solution can be assisted by introducing an inert gas or vapor into the lower portion of the regeneration column. Further, a slip stream of the regenerated contacting solution can be withdrawn continuously or intermittently for removal of accumulated minor impurities and purified as indicated above.

In some instances (e.g., at low processing pressures or when a relatively volatile solvent is used in the contacting solution), supplemental means may be desirable for recovering vaporized solvent from the sweetened gas stream. One suitable means consists of intimately contacting the sweetened gas stream with a liquid which is miscible with the solvent of the contacting solution, separating the solvent-rich liquid from the sweet gas, and subsequently distilling the liquid mixture to recover the solvent. When using the preferred solvent of the present invention, N-methyl-2-pyrrolidone, the wash liquid can be water in which case the solvent is recovered as a kettle product in the distillation step, or the wash liquid may be sulfolane in which case the solvent is recovered as a distillate in the distillation step. In general, a nonaqueous solvent of low volatility is preferred as the wash liquid so that the dehydrated gas will not be resaturated with water. Another method for accomplishing the desired solvent recovery consists of chilling the sweetened gas stream and recovering a substantial portion of the vaporized solvent as a condensate product. Either method can also be applied to recover solvent from the concentrated $H_2S$ stream produced in the regeneration of the sulfide-rich contacting solution.

The following examples further illustrate the process of the present invention

EXAMPLE 1

A solution of 78.46 wt. percent of mixed 2- and 3-cyanopyridines (approximately a 50–50 mixture) in N-methyl 2-pyrrolidone together with 0.017 gram mol of potassium hydrosulfide per gram equivalent of cyanopyridine was prepared. This solution had a crystallization point of about 0° F. Then the solution was tested for sweetening activity with sour natural gas of varying $H_2S$ content as follows: 125 ml. of the contacting solution under test was placed in a gas-absorption bottle having a fritted porcelain disk near the bottom and above the gas inlet to insure uniform gas distribution into the liquid. Ceramic berl saddles of 1 cm. were also placed in the bottle above the fritted disk to promote gas-liquid contact. The sour natural gas stream was bubbled through the solution at a rate of 250–280 cc/min. A bypass line is provided to enable analysis of the feed gas stream without passing through the contacting solution in the gas absorption bottle. With the aid of suitable valving, the feed gas or the treated gas stream was analyzed in a continuous manner by a calibrated automatic recording $H_2S$ analyzer. Thus, the feed gas passed through the bypass line was first analyzed; then, after changing the valving to close off the bypass line and to direct the gas through the absorption bottle, and after allowing about 2 minutes for displacement of inert gas from the bottle, the treated gas was analyzed. By varying the $H_2S$ content of the inlet gas and measuring the $H_2S$ content of the treated gas, dynamic absorption equilibrium was determined for each $H_2S$ content. The pressure on the gas was slightly over atmospheric and the temperature was ambient, i.e., about 72°–74° F. The following results were obtained:

TABLE I

| Grains $H_2S$/100 SCF Gas Feed | | $H_2S$ Conc. Ratio |
|---|---|---|
| Inlet Gas | Outlet Gas | Inlet/Outlet |
| 22.3 | 0.42 | 53.1 |
| 36.2 | 0.47 | 77.0 |
| 70.0 | 4.22 | 16.6 |
| 133.0 | 11.8 | 11.3 |

These results illustrate the effectiveness of the mixture of ortho and meta cyanopyridines in the contacting solution for removal of sulfide from the feed. Also to be noted is the high solubility of the cyanopyridines in N-methyl 2-pyrrolidone.

EXAMPLE 2

Another solution was made up of 50.1 percent mixed 3- and 4-cyanopyridines (about a 50–50 mixture) in N-methyl 2-pyrrolidone with 0.017 gram mol of potassium hydroxide per gram equivalent of cyanopyridine. The solution had a crystallization point of about 0° F. and was tested for sweetening activity in the same manner as in Example 1. The results obtained were as follows:

TABLE II

| Grains $H_2S$/100 SCF Gas Feed | | $H_2S$ conc. Ratio |
|---|---|---|
| Inlet Gas | Outlet Gas | Inlet/Outlet |
| 20.2 | 5.06 | 3.99 |
| 33.7 | 6.82 | 4.94 |
| 70.0 | 24.4 | 2.87 |
| 142 | 71.1 | 2.00 |

The above results illustrate the effectiveness of the mixture of meta and para cyanopyridines in the contacting solutions for removing $H_2S$ from sour gas.

EXAMPLE 3

A solution of 40.5 percent 3-cyanopyridine in N-methyl 2-pyrrolidone along with 0.017 gram mol of potassium hydrosulfide per gram equivalent of cyanopyridine was prepared. The solution had a crystallization point of about 0° F. and was tested for sweetening activity in the manner described in Example 1. The results obtained were as follows:

TABLE III

| Grains $H_2S$/100 SCF Gas Feed | | $H_2S$ conc. Ratio |
|---|---|---|
| Inlet Gas | Outlet Gas | Inlet/Outlet |
| 20.7 | 1.69 | 12.2 |
| 33.3 | | 9.55 |
| 71.7 | 10.1 | 7.10 |
| 137 | 35.5 | 3.86 |

The above results illustrate the removal of $H_2S$ from sour natural gas in one stage of treatment by means of 3-cyanopyridine in the contacting solution. By using additional stages of contacting more $H_2S$ can be removed.

Other tests carried out with solutions of the cyano-pyridines without the hydrosulfide showed that such solutions were inactive.

Numerous other examples can be given to illustrate the present invention and its many applications. For example, a particular application involves treating an $H_2S$-containing gas in a pipeline by concurrently contacting said gas with one of the contacting solutions described hereinabove and providing for accumulation of the $H_2S$ enriched solution such as in sumps, knockout drums, or the like so that the treated gas of reduced $H_2S$ content can continue on and the enriched solution removed for regeneration and recycle as desired.

We claim:

1. A process for removing hydrogen sulfide from a gas mixture containing said hydrogen sulfide, which process comprises contacting said gas mixture with a liquid contacting solution containing a cyanopyridine and an alkali hydrosulfide selected from the group consisting of potassium hydrosulfide, sodium hydrosulfide, lithium hydrosulfide, ammonium hydrosulfide, and dimethyl ammonium hydrosulfide, or compounds capable of producing one of said hydrosulfides, and separating the hydrogen sulfide-enriched contacting solution from a resulting gas stream of reduced hydrogen sulfide content.

2. A process for removing hydrogen sulfide from a gas mixture containing said hydrogen sulfide, which process comprises contacting said gas mixture with a cyanopyridine and an alkali hydrosulfide selected from the group consisting of potassium hydrosulfide, sodium hydrosulfide, lithium hydrosulfide, ammonium hydrosulfide, and dimethyl ammonium hydrosulfide, or compounds capable of producing one of said hydrosulfides in a substantially hydroxyl-free solvent, said cyanopyridine, hydrosulfide and solvent constituting contacting solution and separating the hydrogen sulfide-enriched contacting solution from a resulting gas mixture of reduced sulfide content.

3. The process of claim 2 wherein said contacting solution is regenerated by heating and removing the dissociated hydrogen sulfide.

4. The process of claim 2 wherein said solvent is a pyrrolidone.

5. The process of claim 2 wherein said solvent is N-methyl-2-pyrrolidone and said contacting is carried out at a temperature below about 250° F.

6. The process of claim 2 wherein said cyanopyridine is a mixture of ortho and meta cyanopyridines.

7. The process of claim 2 wherein solvent initially contains a compound capable of producing an alkali hydrosulfide under the reaction conditions.

8. The process of claim 2 wherein said alkali hydrosulfide is potassium hydrosulfide.

* * * * *